(12) United States Patent
Mejean et al.

(10) Patent No.: US 11,081,802 B2
(45) Date of Patent: Aug. 3, 2021

(54) ELECTROMAGNETIC-WAVE-ABSORBING MATERIALS FOR VARIOUS APPLICATIONS

(71) Applicant: UNIVERSITE DE RENNES 1, Rennes (FR)

(72) Inventors: Chloé Mejean, Rennes (FR); Ratiba Benzerga, Saint-Brieuc (FR); Ala Sharaiha, Saint-Gregoire (FR)

(73) Assignee: UNIVERSITE DE RENNES 1, Rennes (FR)

(*) Notice: Subject to any disclaimer, the term of this patent is extended or adjusted under 35 U.S.C. 154(b) by 0 days.

(21) Appl. No.: 16/087,565

(22) PCT Filed: Mar. 20, 2017

(86) PCT No.: PCT/FR2017/050645
§ 371 (c)(1),
(2) Date: Sep. 21, 2018

(87) PCT Pub. No.: WO2017/162973
PCT Pub. Date: Sep. 28, 2017

(65) Prior Publication Data
US 2019/0103679 A1 Apr. 4, 2019

(30) Foreign Application Priority Data
Mar. 21, 2016 (FR) .................................... 1652428

(51) Int. Cl.
*H01Q 17/00* (2006.01)
*C08L 97/00* (2006.01)

(52) U.S. Cl.
CPC .......... *H01Q 17/008* (2013.01); *C08L 97/007* (2013.01); *H01Q 17/00* (2013.01); *H01Q 17/004* (2013.01)

(58) Field of Classification Search
CPC ...................................................... C08L 97/007
See application file for complete search history.

(56) References Cited

U.S. PATENT DOCUMENTS 3,914,392 A * 10/1975 Klett ..................... C04B 35/528
423/445 R

FOREIGN PATENT DOCUMENTS

CN 1789637 A 12/2004
EP 2539592 A1 1/2013
(Continued)

OTHER PUBLICATIONS

Machine translation JP2007106023 (Year: 2007).*
(Continued)

*Primary Examiner* — Alexandre F Ferre (57) ABSTRACT

One subject of the present invention is an electromagnetic-wave-absorbing composite material comprising a carrier matrix (11) and an electromagnetic-wave-absorbing filler (12). According to the invention, the carrier matrix (11) is a cork matrix, which is formed of particles the equivalent diameter $D_{el}$ of which is comprised between 10 μm and 5 mm, and the composite material (1) has a real permittivity higher than 1.2 and a dielectric loss tangent tan δ higher than 0.1. Another subject of the present invention is a method for producing such a material, and the use of this material as an absorber, in particular in an anechoic chamber, or as a radar absorber in stealth devices, or even to improve the electromagnetic compatibility of electronic devices.

20 Claims, 6 Drawing Sheets

(56) References Cited

FOREIGN PATENT DOCUMENTS

| | | |
|---|---|---|
| FR | 2761370 A1 | 10/1998 |
| FR | 2928778 A1 | 9/2009 |
| FR | 3020592 A1 | 11/2015 |
| FR | 3048974 A1 | 9/2017 |
| JP | 1991151698 | 6/1991 |
| JP | 1998270892 | 10/1998 |
| JP | 200458557 A | 2/2004 |
| JP | 2007106023 A | 4/2007 |
| JP | 4371426 B2 | 9/2009 |
| JP | 2009292552 A | 12/2009 |
| JP | 2011134557 A | 7/2011 |
| JP | 201478698 | 5/2014 |
| KR | 20160034149 A | 3/2016 |
| TW | 200535306 A | 11/2005 |
| WO | 2012124290 | 9/2012 |
| WO | WO2017162973 A1 | 9/2017 |

OTHER PUBLICATIONS

Foreign Communication from a Related Counterpart—International Search Report and Written Opinion, dated Jul. 28, 2017, PCT/FR2017/050645, filed Mar. 20, 2017.
Foreign Communication from a Related Counterpart—French Search Report, dated Jul. 20, 2016, FR Application No. 1652428, filed Mar. 21, 2016.
Database WPI Week 201145, Thomson Scientific, London, GB; AN 2011-H67518 XP002759250 Jul. 7, 2011.

\* cited by examiner

ELECTROMAGNETIC-WAVE-ABSORBING MATERIALS FOR VARIOUS APPLICATIONS

CROSS-REFERENCE TO RELATED APPLICATIONS

This application is a filing under 35 U.S.C. 371 as the National Stage of International Application No. PCT/FR2017/050645, filed Mar. 20, 2017, entitled "NEW ELECTROMAGNETIC-WAVE-ABSORBING MATERIALS FOR VARIOUS APPLICATIONS," and which claims the benefit of and priority to France Application No. 1652428, filed with the Intellectual Property Office of France on Mar. 21, 2016, both of which are incorporated herein by reference in their entirety for all purposes.

The present invention is in the field of absorbers of electromagnetic waves, and in particular the hyperfrequency electromagnetic waves.

The composite materials consisting of a matrix containing a polymer foam and filled with materials having specific properties are of interest for the attenuation of the electromagnetic waves in the hyperfrequency range and are at present widely used, in particular in anechoic chambers.

Pyramidal absorbers made of polyurethane (PU) foam and filled with carbon black are at present the absorbers giving the best performance over a wide band of frequencies in the radiofrequency and hyperfrequency ranges, and are by far the electromagnetic absorbers the most widely used for the manufacturing of anechoic chambers.

Nevertheless, these materials have a major disadvantage: their manufacturing method induces an inhomogeneity in composition and the machining of the PU foam is complicated. Indeed, the manufacturing of absorbers made of polyurethane (PU) foam involves the impregnation of polyurethane foam (without fillers) in an aqueous solution containing carbon in order to give it the absorbent filler. This manufacturing method induces an inhomogeneity in composition, which is increased in the case of parts having a pyramidal shape. Moreover, the machining of this PU foam is rather complicated because of the weak mechanical properties of the latter, which in the end results in a non-reproducibility of the dimensions of the final part and, likewise, in a non-reproducibility of the properties of the final product.

The invention presented here is aimed at developing a new class of electromagnetic absorbers by using a new supporting material (or matrix) as a replacement for PU foam while having identical or better performance in terms of reflectivity with normal and oblique incidence than the pyramidal absorbers made from PU foam (for an absorber height less than or equal to that of current absorbers).

A person skilled in the art is aware of devices for electromagnetic absorption implementing cork.

Thus, the Japanese patent application JP4371426 describes a plate of a ligneous wood coated with a magnetic paint in order to obtain the absorbent nature. It is specified that the wood used can be cork. The wood is thus filled only on the surface.

Moreover, the European patent application EP2539592 describes a PU foam in which perforations are made, the walls of said perforations being coated with a conductive filler. This PU foam can be replaced by a plate of cork. Here, the filler is only present on the walls of the perforations.

Consequently, the plates taught by the documents JP4371426 and EP2539592, filled only on the surface, act as a shielding and cannot be considered to be electromagnetically absorbent. Moreover, they have a very specific shape. However, the intended uses require varied shapes such as pyramids, dihedrons and parallelepipeds.

To overcome the aforementioned defects and disadvantages, the applicant has developed a composite material that absorbs electromagnetic waves and comprises:
 a supporting matrix,
 a filler that absorbs electromagnetic waves, said composite material being characterised in that the supporting matrix is a matrix of cork, which is formed of particles having an equivalent diameter $D_{el}$ between 10 µm and 5 mm, and
in that said composite material has a real permittivity greater than 1.2 and a dielectric loss tangent tan δ greater than 0.1.

Particles of cork means, in the sense of the present invention, either granules of cork having an equivalent diameter between 1 mm and 5 mm, and preferably between 2 mm and 3 mm, or cork powder having a particle size distribution that ranges from 10 µm to 1000 µm.

The advantage of cork for solving the technical problem is that it has the following properties:
 it is a product present in the natural state in the bark of certain trees. The carbon impact of the use of such a material is therefore greatly reduced with respect to that of a matrix made from a material made via petrochemistry. Moreover, the use of cork is consistent with changes in environmental norms.
 it is a material having a very high fire resistance since it does not propagate the flame and does not give off toxic flue gas. Its use thus allows the norms applicable to anechoic chambers to be respected (in particular the REACH standards).
 it has the advantage of having a low density, of approximately 240 kg/m$^3$, which allows a light composite material to be obtained.
 it has a good dimensional stability and good mechanical strength, which eliminates the problems of machinability that are generally encountered with matrices of polyurethane foam. These characteristics allow good reproducibility of the final part to be obtained.

In an advantageous alternative of the composite material according to the invention, the matrix can be formed from expanded cork, which has the advantage of having a density of approximately 70 kg/m$^3$, which is less than the value of the density of non-expanded cork.

Advantageously, the particles of cork are coated with said filler. This coating is made possible since the cork naturally has numerous pores opening onto its surface, these pores providing a multitude of attachment points for the filler. Moreover, the small particle size of the particles of cork allow them to have a large specific surface area for the coating.

The filler that absorbs electromagnetic waves make the composite material according to the invention electromagnetically absorbent.

Advantageously, the filler can be in the form of microparticles or nanoparticles having an equivalent diameter $D_{ec}$ between 1 nm and 1000 µm.

Advantageously, the filler can be a magnetic, dielectric, or electrically conductive filler.

In the case of a filler that conducts electricity, this filler can advantageously be in the form of metal particles, particles of carbon, carbon fibres or carbon nanotubes, or in the form of graphene.

The composite material according to the invention thus obtained thus conjointly has the lightness and fire resistance properties of cork and the properties of the filler that absorbs electromagnetic waves.

Advantageously, the composite material according to the invention can further comprise a binder made of thermoplastic or thermosetting polymer resin.

The properties of the material according to the invention allow its use as an absorber, in particular in anechoic chambers, and as a radar absorber in stealth devices. Its properties also make it suitable for improving the electromagnetic compatibility of electronic devices such as onboard systems, measurement apparatuses, etc.

Consequently, the object of the present invention is therefore also the use of the composite material according to the invention for each of the three aforementioned uses.

Finally, the object of the present invention is also a method for manufacturing a composite material according to the invention, involving:

A) Creation of a preparation containing:
   particles of cork, the equivalent diameter $D_{el}$ of which is between 10 μm and 5 mm, and
   a filler that absorbs electromagnetic waves, said filler being in the form of nanoparticles or microparticles having an equivalent diameter $D_{ec}$ between 1 nm and 1000 μm;

B) Shaping of said composite material from said preparation.

The filler and the cork are as defined above.

According to a first advantageous embodiment of the method according to the invention, the step A of shaping can comprise the following substeps:

A1) placing said filler in an aqueous solution;
A2) adding the aqueous solution containing said filler to particles of cork, then mixing until a homogenous preparation is obtained;
A3) drying of said homogenous preparation in open air or in a drier at a temperature between 50° C. and 120° C., until complete evaporation of the aqueous phase, in such a way as to obtain granules of cork coated with filler.

Advantageously, in this first embodiment, a resin can be added, after the substep A3) of drying, to said granules of cork coated with filler in order to obtain a bound preparation.

According to a second advantageous embodiment of the method according to the invention, the step A) of creating said preparation can comprise the following substeps:

A'1) incorporation of said filler into a resin; then
A'2) introduction of said particles of cork into the mixture of resin and filler thus formed.

Advantageously, for the first embodiment when it involves the use of a resin and for the second embodiment, the step B) of shaping can be carried out via introduction of the mixture thus obtained into a container having a specific shape.

Advantageously, in the two aforementioned embodiments, the resin can be a resin that is biosourced or not.

For example, non-biosourced resins that can be used in this context include an epoxy resin, polyurethane, and polyester.

In the sense of the present invention, biosourced resin means a resin substantially obtained from plant raw materials.

For example, biosourced resins that can be used in this context include in particular polylactic acid (PLA), which is a derivative made from corn starch, or polyamide 11 (PA 11), which is a derivative of castor oil.

When the method according to the invention does not use a resin, the step B) of shaping can be advantageously carried out by compacting said particles of cork coated with filler at a pressure between 10 MPa to 10,000 MPa, in such a way as to give the final composite material the desired shape.

When the method according to the invention does not use a resin, the step B) of shaping can also advantageously be carried out by
   introducing the particles of cork coated with filler into a container having a specific shape; then
   heating the particles of cork coated with filler to a temperature of at least 200° C., in order to obtain a composite material having a mechanical strength sufficient to make it suitable for being manipulated.

The heating of the particles of cork coated with filler allows the release of the resin naturally present in the cork that then acts as a binder and thus gives the final composite material cohesion.

These various embodiments of the method according to the invention allow the manufacturing of composite materials according to the invention that are sufficiently rigid to be manipulated and suitable for being machined into various shapes that allow their properties of absorption of electromagnetic waves to be optimised.

Other advantages and particularities of the present invention will result from the following description, which is given as a non-limiting example in reference to the appended drawings:

FIG. 1 shows three photographs showing, respectively, cork powder (1a), granules of cork (1b), and granules of expanded cork (1c);

FIG. 4 shows the change in the permittivity ε' (FIG. 4a) and in the loss tangent tan δ (FIG. 4b) of the composite material illustrated in FIG. 3, according to the frequency and the concentration of carbon in the composite.

FIG. 5 shows two photographs of other examples of composite materials according to the invention, obtained by addition of epoxy resin to granules of cork (5a) or to cork powder (5b) coated with absorbent fillers;

FIG. 6 shows the change in the real permittivity ε' (FIG. 6a) and in the loss tangent tan δ (FIG. 6b) of the composite materials illustrated in FIGS. 5a and 5B, according to the frequency;

FIG. 7 shows a photograph (7a) of an example of a composite material according to the invention obtained by the addition of polyurethane resin to granules of cork coated with carbon, and FIG. 7b) is a detailed and enlarged view of a portion of the photograph (7a);

FIG. 9 shows the change in the permittivity ε' (FIG. 9a) and in the loss tangent tan δ (FIG. 9b) of the composite materials illustrated in FIGS. 7a, 7b and 8, according to the frequency and the concentration of carbon in the composite;

Figure 1A:
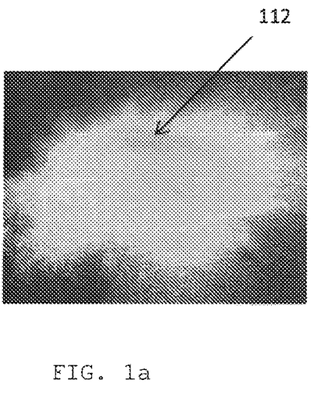
Figures 1B, 1C:
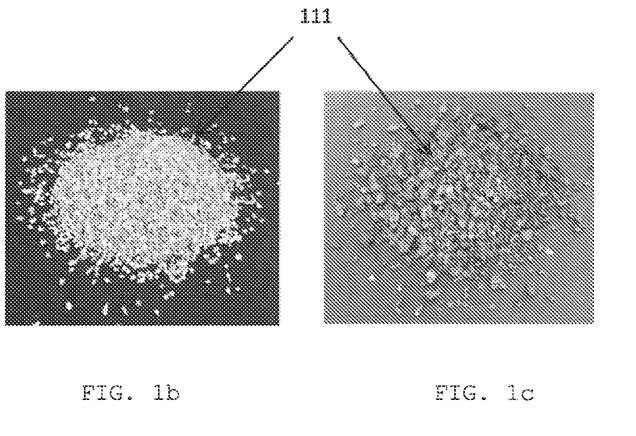

FIG. 1 shows the various types of particles of cork used to manufacture the supporting matrix 11 of said composite material 1. This cork can be raw (1a and 1b) or expanded (1c), and can be either in the form of granules 111 (cf. FIGS. 1b and 1c) or in the form of a powder 112 (cf. FIG. 1a).

Figure 2:
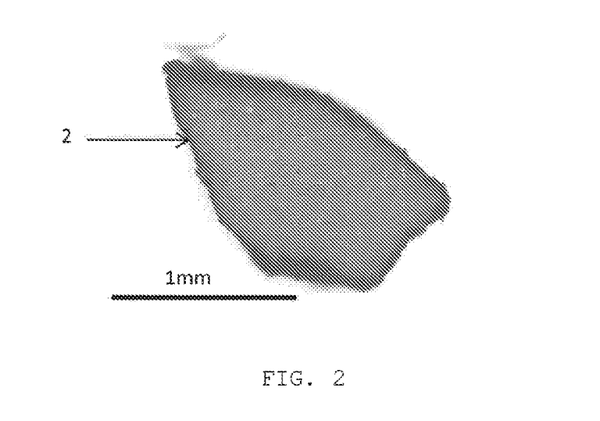
FIG. 2 shows an image, taken with an optical microscope, of a cross-section of a granule of cork coated with absorbent fillers.

FIG. 2 shows a cross-sectional image of an example of a granule of cork coated 2 with filler having a random shape, observed via an optical microscope.

Figure 3:
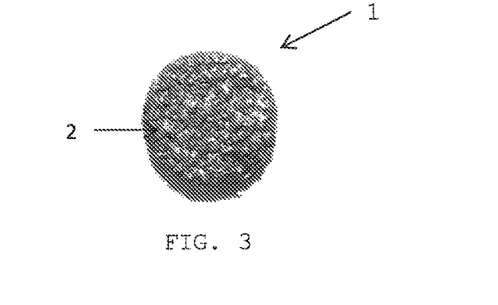
FIG. 3 shows a photograph of a first example of a composite material according to the invention, obtained by compacting granules of cork coated with carbon black.

FIG. 3 shows a pellet of composite material of the invention 1, obtained by compacting granules of cork coated 2 with carbon at a pressure of 370 MPa.

Figure 4A:
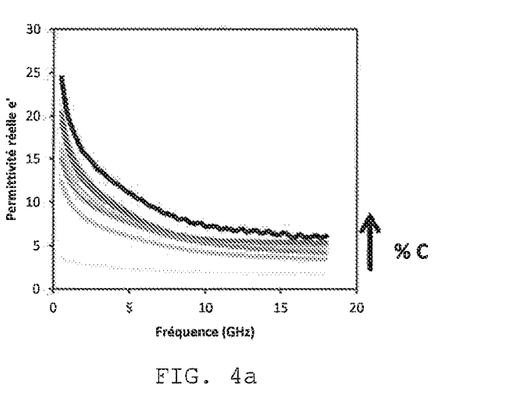
Figure 4B:
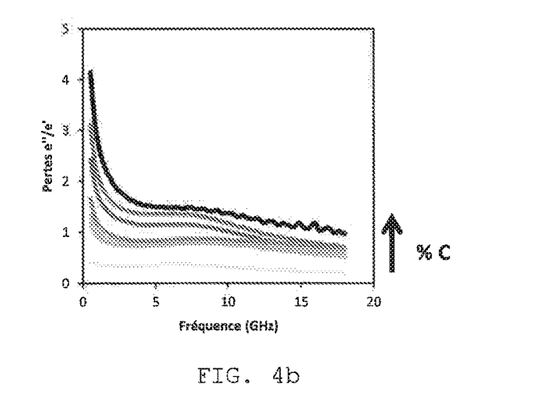

FIG. 4 shows the change in the relevant physical properties of the composite material 1 illustrated in FIG. 3, that is to say, the permittivity and the loss tangent, according to the frequency and the concentration of carbon in said material 1. FIG. 4 shows in particular that the permittivity and the loss tangent increase with the concentration of filler (here, of carbon). It also shows a reduction in these properties according to the frequency: a large reduction between 0.5 and 5 GHz followed by a smaller reduction after 5 GHz.

Figure 5A:
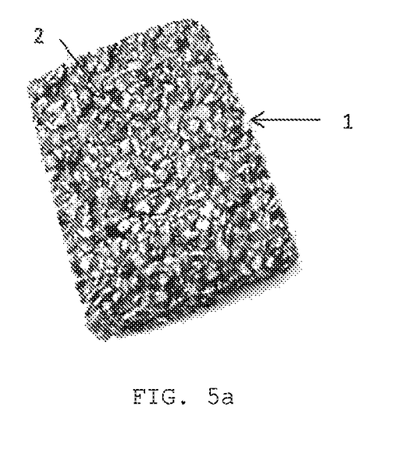
Figure 5B:
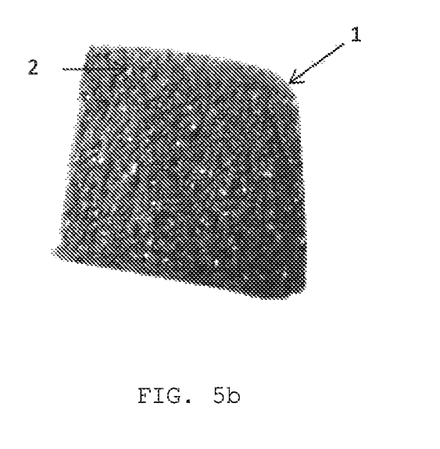

FIG. 5 shows the result of a shaping of the composite material according to the invention 1 via the addition of an epoxy resin to granules of cork coated 2 with carbon (cf. FIG. 5a) or to a cork powder coated 2 with carbon (cf. FIG. 5b).

Figure 6A:
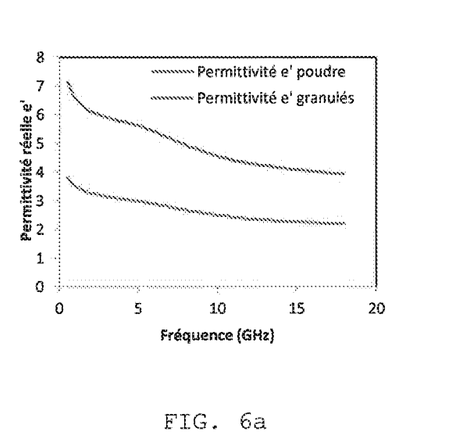
Figure 6B:
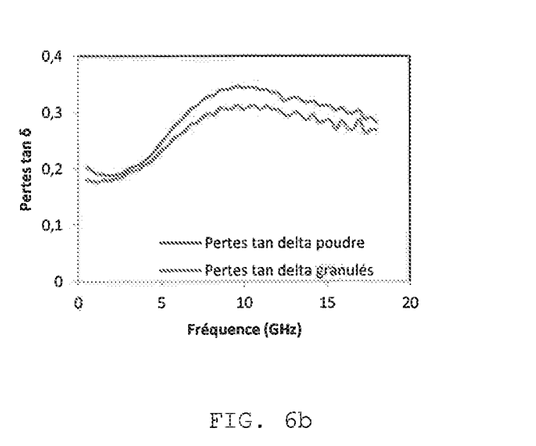

FIG. 6 shows the change in the real permittivity ε' (cf. FIG. 6a) and in the loss tangent tan δ (cf. FIG. 6b) of the materials 1 illustrated in FIG. 5 according to the frequency and the nature of the cork. The change in the permittivity of said material 1 illustrated in the drawing (cf. FIG. 5a) is the same as that of the material obtained by compacting. FIG. 6 shows that the use of powder 112 or of granules 111 has an effect on the permittivity: the finer the particles, the greater the permittivity. This variation is also visible for the loss tangent, although to a lesser extent. This is related to the fact that in general, the specific surface area of a powder is greater than that of granules, the coating with carbon 12 is therefore greater in the case of the powder 112. This may also be related to the difference in density between the two materials.

Figure 7A:
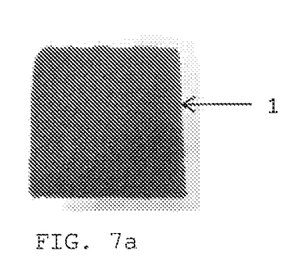
Figure 7B:
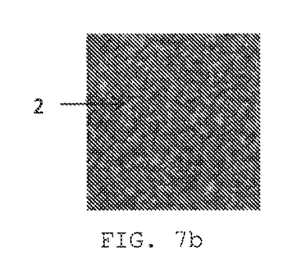

FIG. 7 shows the result of a shaping via addition of polyurethane resin to granules of cork coated 2 with carbon. Since this resin has a lower viscosity than the epoxy resin used for the samples of FIG. 5, a smaller quantity of resin is therefore necessary to bind all the granules of cork by coating them. The composite material 1 thus obtained therefore has a smaller density than the composite material illustrated by FIG. 5.

Figure 8:
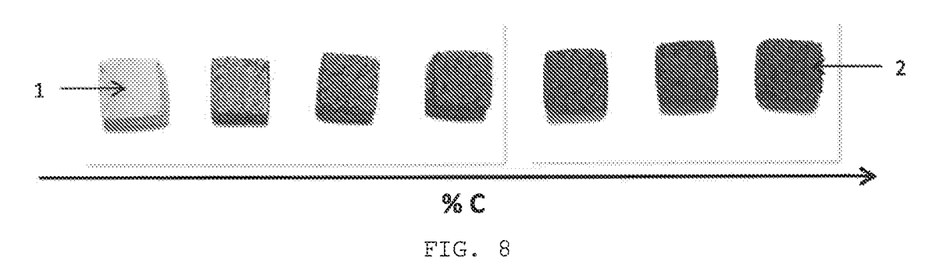
FIG. 8 shows photographs of various samples of composite material according to the invention obtained by the addition of polyurethane resin to granules of cork coated with carbon, with an increasing concentration of carbon from left to right in the drawing.

FIG. 8 shows photographs of various samples of composite materials 1 according to the invention obtained by the addition of polyurethane resin to granules of cork coated 2 with carbon, with an increasing concentration of carbon from left to right in the drawing. The quantity of filler 12 used in the composite material 1 according to the invention is variable and depends on the desired properties according to the intended use.

Figure 9A:
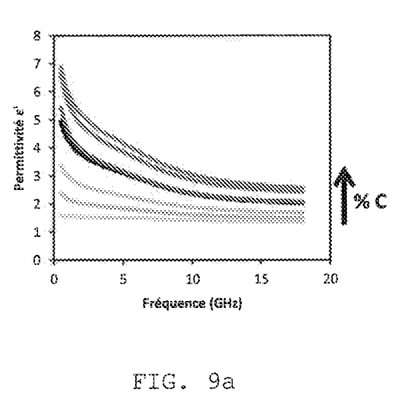
Figure 9B:
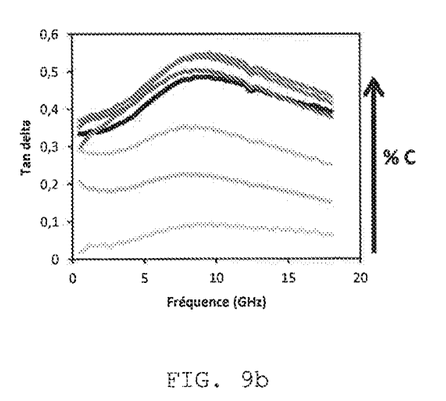

FIG. 9 shows the change in the relevant physical properties of the composite material 1 illustrated in FIG. 8, that is to say, the permittivity (FIG. 9a) and the loss tangent (FIG. 9b), according to the frequency and the concentration of carbon. The rates of change of the curves are the same as those obtained for the composite materials according to the invention obtained by the addition of epoxy resin. The change in resin thus only has an impact on the density.

Figure 10A:
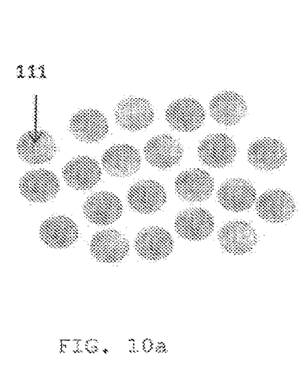
FIG. 10 shows an embodiment of the method of manufacturing an example of a composite material according to the invention via the addition of resin.
Figure 10B:
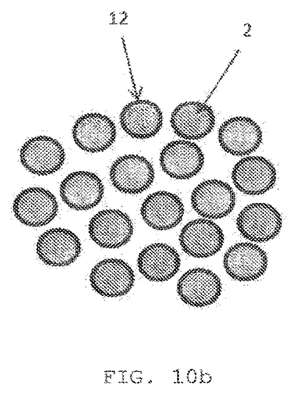
Figure 10C:
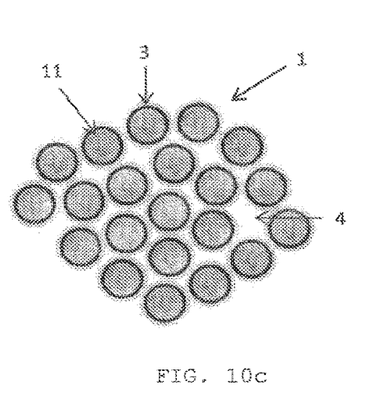

FIG. 10 shows the method of shaping the material according to the invention 1 by the addition of resin 3. FIG. 10a shows uncoated granules of cork 111, while FIG. 10b shows these same granules once coated 2 with filler 12; finally, FIG. 10c shows these same granules of cork 111 after the addition of the resin 3 with which they are bound. The presence of porosities 4 in the composite material 1 thus obtained is observed, as illustrated in FIG. 10C. Since the composite materials 1 according to the invention obtained by compacting contain less porosities, their density is thus greater than that obtained for a composite material 1 according to the invention formed by the addition of resin.

The intended uses for the material according to the present invention require different densities, loss tangents and permittivities. By varying the concentration and the type of filler and by choosing the suitable manufacturing method, it is possible to manufacture a composite material having a set of properties (density, loss tangent, permittivity) suitable for the intended use.

Figure 11A:
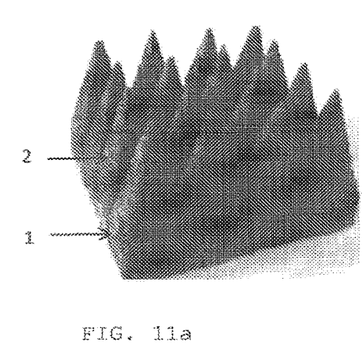
FIG. 11 shows two photographs and a diagram of an example of a material according to the invention obtained by the addition of resin, in the shape of pyramids for a use in an anechoic chamber.
Figure 11B:
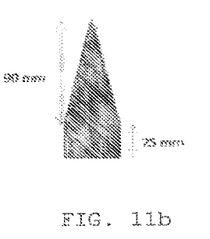
Figure 11C:
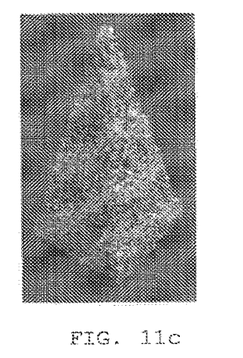

FIG. 11a is a photograph of a prototype of a composite material 1 according to the invention for an anechoic chamber, in forms of an assembly of juxtaposed pyramids. This composite material 1 is made with granules of cork coated 2 with carbon and bound with polyurethane resin; FIG. 11b is a diagram showing a pyramid of the prototype illustrated in FIG. 11a and FIG. 11c is a photograph of the top of a pyramid of the prototype illustrated in FIG. 11a.

Figure 12:
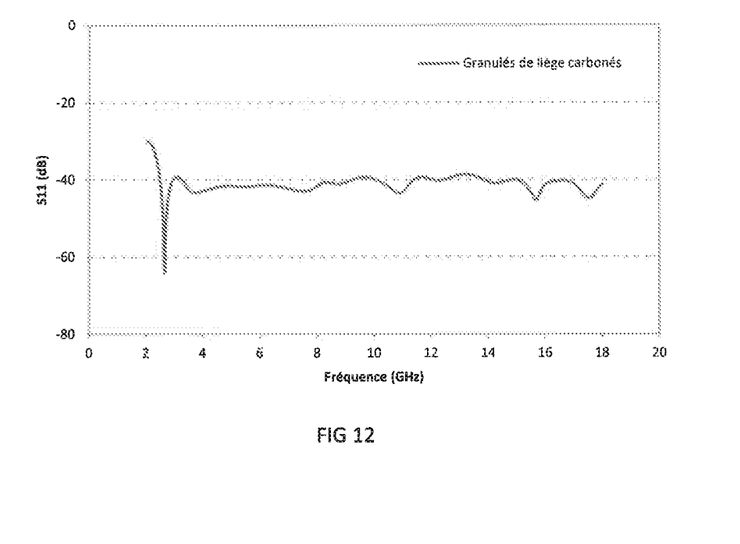
FIG. 12 shows a digital simulation of the change in the coefficient of reflection of a set of pyramids of material according to the invention filled with carbon black, the simulation being carried out using the permittivity and the loss tangent of the pyramids measured in an anechoic chamber.

FIG. 12 is the result of the digital simulation of the frequency response of the coefficient of reflection of a set of pyramids manufactured with the material according to the invention illustrated in FIG. 11. This digital simulation is based on the values for permittivity and loss tangent of the material forming the pyramids manufactured according to the invention. These properties having been previously measured in an anechoic chamber.

FIG. 12 shows that the frequency response of the coefficient of reflection of all of the pyramids is located on average around −40 dB, which is largely less than the limit of −10 dB required for electromagnetic absorbers.

Figure 13:
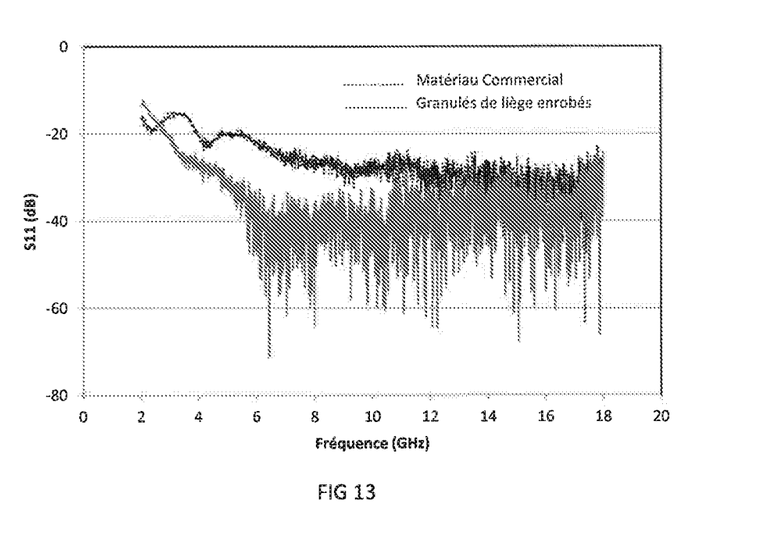
FIG. 13 shows the real measurement of the change in the coefficient of reflection of a set of pyramids of material according to the invention filled with carbon black; this change is compared to that which is measured in the same conditions with a commercial composite material (PU matrix filled with carbon black)

FIG. 13 shows the real frequency response of the aforementioned set of pyramids (made with a material according to the invention) and the real frequency response of a set of pyramids made from a commercial material (PU foam). FIG. 13 shows comparable results for the material of this invention and the commercial material for the frequencies greater than 12 GHz and better results for the frequencies lower than 12 GHz.

The invention claimed is:

1. Composite material that absorbs electromagnetic waves and comprises:
   a supporting matrix,
   a filler configured to absorb electromagnetic waves,
   said composite material being characterised in that the supporting matrix is a matrix of cork, which is formed of particles having an equivalent diameter $D_{e1}$ between 10 μm and 5 mm, and in that said composite material has a real permittivity greater than 1.2 and a dielectric loss tangent tan δ greater than 0.1.

2. Material according to claim 1, wherein the cork of the supporting matrix is natural cork or expanded cork.

3. Material according to claim 1, wherein the particles of cork are coated with said filler.

4. Material according to claim 1, wherein said filler is in the form of microparticles or nanoparticles having an equivalent diameter $D_{ec}$ between 1 nm and 1000 μm.

5. Material according to claim 1, wherein said filler is a magnetic filler, a dielectric filler, or a filler that conducts electricity.

6. Material according to claim 5, wherein said filler is a filler that conducts electricity, in the form of metal particles, particles of carbon, carbon fibres or carbon nanotubes, or in the form of graphene.

7. Material according to claim 1, further comprising a binder made of thermoplastic or thermosetting polymer resin.

8. Material according to claim 1, wherein the composite material is configured to absorb electromagnetic waves in a range of 0.5 GHz to 18 GHz.

9. Material according to claim 1, wherein the composite material is an isotropic material.

10. A method comprising:
    using the material as defined according to claim 1 as an absorber in an anechoic chamber.

11. A method comprising:
    using the material as defined according to claim 1 as a radar absorber in stealth devices.

12. A method comprising:
    using the material as defined according to claim 1 in order to improve the electromagnetic compatibility of electronic devices.

13. Method for manufacturing a composite material that absorbs electromagnetic waves as defined according to claim 1, said method involving:
    A) Creation of a preparation containing:
        particles of cork, the equivalent diameter Dei of which is between 10 μm and 5 mm, and
        a filler that absorbs electromagnetic waves,
    B) Shaping of said composite material from said preparation.

14. Method according to claim 13, wherein the step A) of creating said preparation comprises the following substeps:
    A1) placing said filler in an aqueous solution;
    A2) adding the aqueous solution containing said filler to particles of cork, then mixing until a homogenous preparation is obtained;
    A3) drying of said homogenous preparation in open air or in a drier at a temperature between 50° C. and 120° C., until complete evaporation of the aqueous phase, in such a way as to obtain particles of cork coated with filler.

15. Method according to claim 14, wherein a resin is added, after the drying A3), to said particles of cork coated with filler in order to obtain a bound preparation.

16. Method according to claim 15, wherein the resin is a resin that is biosourced.

17. Method according to claim 14, wherein the step B) of shaping is carried out by compacting said particles of cork coated with filler at a pressure between 10 MPa and 10,000 MPa.

18. Method according to claim 14, wherein the step B) of shaping is carried out by:
    introducing said particles of cork coated with filler into a container having a specific shape; then
    heating said granules of cork coated with filler to a temperature of at least 200° C. in order to obtain a composite material having a mechanical strength sufficient to make it suitable for being manipulated.

19. Method according to claim 13, wherein the step A) of creating said preparation comprises the following substeps:
    A'1) incorporation of said filler into a resin; then
    A'2) introduction of said particles of cork into the mixture of resin and filler thus formed.

20. Method according to claim 13, wherein the step B) of shaping is carried out via introduction of the preparation thus obtained into a container having a specific shape.

* * * * *